United States Patent
Rollfs Of Roelofs

(10) Patent No.: US 10,755,606 B2
(45) Date of Patent: Aug. 25, 2020

(54) MULTILAYERED SHEET ASSEMBLY AND A METHOD FOR FORMING A SIGN

(71) Applicant: W.R.R. HOLDING LEIDEN B.V., Leiden (NL)

(72) Inventor: Willem Klaas Rollfs Of Roelofs, Leiden (NL)

(73) Assignee: W.R.R. HOLDING LEIDEN B.V., Leiden (NL)

( * ) Notice: Subject to any disclaimer, the term of this patent is extended or adjusted under 35 U.S.C. 154(b) by 0 days.

(21) Appl. No.: 15/747,813

(22) PCT Filed: Jul. 27, 2016

(86) PCT No.: PCT/NL2016/050556
§ 371 (c)(1),
(2) Date: Jan. 26, 2018

(87) PCT Pub. No.: WO2017/018882
PCT Pub. Date: Feb. 2, 2017

(65) Prior Publication Data
US 2018/0218651 A1 Aug. 2, 2018

(30) Foreign Application Priority Data
Jul. 28, 2015 (NL) .................................. 2015230

(51) Int. Cl.
*G09F 7/00* (2006.01)
*B32B 7/00* (2019.01)
(Continued)

(52) U.S. Cl.
CPC .............. *G09F 7/12* (2013.01); *B26D 3/085* (2013.01); *B26F 1/3813* (2013.01); *B26F 1/44* (2013.01);
(Continued)

(58) Field of Classification Search
CPC ......... B32B 7/06; B32B 7/12; B32B 38/0004; B32B 38/10; B32B 2038/042;
(Continued)

(56) References Cited

U.S. PATENT DOCUMENTS

| 4,550,683 A | 11/1985 | Jones | |
|---|---|---|---|
| 4,604,153 A * | 8/1986 | Melbye | B05C 17/06 156/235 |

(Continued)

FOREIGN PATENT DOCUMENTS

| EP | 0480199 A2 * | 4/1992 | ............. B32B 27/12 |
|---|---|---|---|
| EP | 1129867 A1 * | 9/2001 | ............... B26D 7/27 |
| GB | 1227841 * | 4/1971 | ............... B41M 1/12 |

OTHER PUBLICATIONS

Boers, Dr. R.B., International Search Report, PCT International Application No. PCT/NL2016/050556, dated Feb. 23, 2016.

*Primary Examiner* — Linda L Gray
(74) *Attorney, Agent, or Firm* — Perry + Currier Inc.

(57) ABSTRACT

A multilayered sheet assembly includes a carrier layer on which a sign layer is arranged on a first side via a first adhesive layer. The sheet assembly further includes a strip layer which is arranged via a second adhesive layer in adhesively separable manner on a second side of the carrier layer. A further includes arranging the multilayered sheet assembly on a cutting device, arranging a peripheral cut in the sheet assembly along an outer periphery of a sign, arranging an inner cut in the sheet assembly along a peripheral line of at least one enclosed surface area not forming part of the sign, separating the strip layer with adhesive retention of the at least one enclosed surface area not forming part of the sign, and separating the sign layer from the carrier layer.

4 Claims, 3 Drawing Sheets

(51) Int. Cl.
*B32B 27/00* (2006.01)
*B32B 29/00* (2006.01)
*B26F 1/00* (2006.01)
*B26F 3/00* (2006.01)
*B26D 3/00* (2006.01)
*B32B 38/00* (2006.01)
*G09F 7/12* (2006.01)
*B32B 7/06* (2019.01)
*B32B 27/36* (2006.01)
*B32B 29/06* (2006.01)
*B26F 1/38* (2006.01)
*B32B 7/12* (2006.01)
*B26F 3/16* (2006.01)
*B26D 3/08* (2006.01)
*G09F 3/10* (2006.01)
*B26F 1/44* (2006.01)
*B32B 7/14* (2006.01)
*B32B 27/10* (2006.01)
*G09F 3/02* (2006.01)

(52) U.S. Cl.
CPC ............... *B26F 3/16* (2013.01); *B32B 7/06* (2013.01); *B32B 7/12* (2013.01); *B32B 7/14* (2013.01); *B32B 27/10* (2013.01); *B32B 27/36* (2013.01); *B32B 29/002* (2013.01); *B32B 29/06* (2013.01); *B32B 38/0004* (2013.01); *G09F 3/10* (2013.01); *B26F 2210/00* (2013.01); *B32B 2255/10* (2013.01); *B32B 2255/12* (2013.01); *B32B 2255/26* (2013.01); *B32B 2405/00* (2013.01); *G09F 2003/0257* (2013.01); *G09F 2007/127* (2013.01)

(58) Field of Classification Search
CPC .......... B32B 2038/045; B32B 2250/03; B32B 2250/05; B32B 2590/00; B32B 2037/1246; B32B 37/12; B32B 43/003; Y10T 156/1057; Y10T 156/1064; Y10T 156/1082; B29C 2793/0054; B29C 2793/0036
See application file for complete search history.

(56) References Cited

U.S. PATENT DOCUMENTS 5,026,584 A * 6/1991 Logan ..................... B44C 1/105
428/40.2
6,677,021 B1 * 1/2004 Barnette .................. G09F 7/00
40/594

* cited by examiner

MULTILAYERED SHEET ASSEMBLY AND A METHOD FOR FORMING A SIGN

The present invention relates to a multilayered sheet assembly for forming a sign, comprising a carrier layer on which a sign layer is arranged on a first side via a first adhesive layer.

A multilayered sheet assembly for forming a sign as referred to in the preamble is usually applied in the textile printing industry in which a sign, such as lettering or a logo, is cut before being arranged durably on textile. This arranging usually takes place at increased temperature and under pressure of for instance a heat press. Such a sign is formed by cutting a sheet into a pre-specified shape. This is possible for instance by applying a cutting plotter in which a movable knife cuts a controllable contour from the sheet, after which the surrounding material which is not used for the sign is removed, whereby the sign remains behind on the carrier layer. This sign can subsequently be arranged on textile, and alternatively also be arranged as for instance lettering on glass, cars or other surfaces which may or may not be smooth. In some cases however the sign comprises not only a closed surface area but also parts with enclosed surface area. These are parts of the sign which are enclosed within the main surface area of the sign but which have to be removed from the sign. These include letters such as the letters P, O, R, B and the like in which an enclosed surface area of the sign is present within the surface area to be used. In addition, this can also occur in the case of other random cut shapes in which a portion of the sign has to be removed before the sign can be arranged. Since the cutting lines are often very thin, it is often difficult for an end user to identify all elements to be removed from the sign and very many and/or very small parts of enclosed surface area can sometimes also be present, whereby manual removal of these parts can be time-consuming and can result in mistakes whereby loss of material can occur or unnecessary replacement products have to be made, with all the drawbacks this entails.

The present invention thus has for its object, among others, to provide a multilayered sheet assembly for the purpose of forming a sign which obviates at least one of the stated drawbacks.

In order to achieve the stated object, a multilayered sheet assembly for forming a sign has the feature according to the invention that it further comprises a strip layer which is arranged via a second adhesive layer in adhesively separable manner on a second side of the carrier layer.

Owing to this innovative construction of the multilayered sheet assembly it is possible, by cutting the shapes to a correct depth from the sheet assembly and by separating the strip layer, to remove the enclosed surface areas of a sign through adhesion of the enclosed surface areas to be removed to this strip layer. By cutting the outer periphery of the sign to be formed with the sheet assembly to the depth of the carrier, as is usual, and by also making the cuts in the enclosed surface areas to be removed, such as for instance the inner part of a letter O, to the depth of the strip layer, it is possible after the cutting to remove the inner part of the letter O by separating the strip layer from the carrier, this without any knowledge of the sign to be formed and without removing each enclosed surface area individually. The multilayered sheet assembly hereby ensures a more efficient processing of sheeting during forming of a sign and prevents erroneous removal of surface areas from the sign. The sign layer can be a predetermined colour here, such as plain white or another colour, optionally provided with reflective elements. It is in addition also possible to make the sign layer printable using for instance known printing techniques such as inkjet or offset techniques. The cutting can be performed with a cutting plotter, wherein the sheet is provided with cuts by a movable knife or for instance by a laser cutter. In known cutting plotters it is possible to precisely adjust the depth of each cut. This can also be adjusted according to the image. It is hereby possible to make individual cuts to a specific depth in the sign. By varying the cuts between the depth of the carrier layer and the strip layer located thereunder, highly efficient use can be made of this sheet assembly to form a sign by removing enclosed parts thereof.

The strength of the diverse adhesive layers can vary depending on the desired application. The adhesive layers must adhere sufficiently here in order to hold the layers to each other in nominal state. In addition, the second adhesive layer between the carrier layer and the strip layer must adhere sufficiently to remove cut free enclosed portions of the sign when the strip layer is separated from the carrier layer. Depending on the application, the adhesion of the first adhesive layer between the sign layer and the carrier layer can be very strong if the adhesive layer is for instance used following separation to serve as direct adhesion to the object on which the sign is arranged, although if another method of adhesion is applied, or for instance the adhesion of the sign takes place on the opposite side, the first adhesive layer can suffice with an adhesive force which is sufficient to hold the layers together but detachable enough to facilitate separation by hand. Adhesive layers are formed by per se known adhesive means.

A preferred embodiment of a multilayered sheet assembly according to the present invention has the feature that the carrier layer comprises at least on the first side a release coating such that the sign layer is releasable from the carrier layer. By matching the release coating and the adhesive means in the adhesive layers it is possible, depending on the desired application of the sheet, to achieve a balance between on the one hand the ease with which the layers can be separated and on the other the adhesion of a layer, or for instance the final sign, to an object. When for instance a high adhesive force is desired for permanent adhesion of the sign to an object, it is possible, in order to prevent too high a separating force between the carrier and the sign layer, to apply a release coating to the carrier layer. This release coating hereby facilitates separation between the layers while the adhesive means can be used where necessary for a permanent application. In addition, the adhesive layer can also be a thermally activated adhesive layer which adheres durably to an object at increased pressure and/or temperature. The adhesive layer can also be formed by the sign layer itself. By arranging a hot-melt pattern on the carrier layer the adhesive layer can in this latter case be created between the hot-melt sign and the carrier layer itself. In a further preferred embodiment of the multilayered sheet assembly according to the invention the release coating comprises silicones. A silicone coating on the carrier layer provides for an easy release of the sign layer from the carrier and/or of the strip layer from the carrier.

The adhesive means can alternatively also comprise removable glue. The glue holds the various layers firmly adhered to each other but is subsequently easy to remove. It is in this way not strictly necessary to apply a release coating, although this removable glue can also be combined with a release coating such as a silicone coating. It is important here that the layers of the sheet assembly are adhered to each other such that, during removal of the strip layer, the cut free parts of the pattern thereabove are also removed while being adhesively retained on the strip layer. In a preferred embodiment of a multilayered sheet assembly according to the invention the first adhesive layer is formed such that the sign layer can be arranged durably via the first adhesive layer on a surface such as a glass surface of for instance a glass object, a car bodywork, a building or other objects. By already providing the first adhesive layer in the sheet assembly with adhesive means suitable for the desired application a sign such as lettering or other sign can be applied as a sticker to an object. An application film or application tape can alternatively be used for this purpose which is placed on the upper side of the sign once the sign has been cut and released from the unnecessary portions. The adhesive force between the upper side of the sign and the application film or tape separates the sign from the carrier layer and then adheres it to an object using the first adhesive layer. The first adhesive layer can alternatively also be supplemented with a specific additional adhesive means.

In a preferred embodiment of a multilayered sheet assembly according to the invention the first adhesive layer is formed such that the sign layer can be arranged durably on an object via the first adhesive layer using thermal activation. This is particularly advantageous in the case of application to for instance textile such as clothing or other porous objects. This adhesion method is particularly advantageous for use in a heat press in which the sign is arranged on the object under increased pressure and at increased temperature.

The sign layer can be formed as a plain colour, take a preprinted or printable form. The sign layer can also be embodied as a transparent sheet layer, optionally with a protected adhesive layer. In an embodiment this layer is embodied such that it comprises an adhesive layer on the upper surface which is protected during processing by means of a protective layer. A sheet thus results which can be cut in the desired shape as a double-sided adhesive sheet assembly, so that for instance lettering or other signs can be arranged on this adhesive layer similarly to double-sided adhesive tape. This can advantageously be applied in for instance the mounting of injection-moulded lettering or other objects on for instance a wall or door of an object such as a car or building.

The invention also relates to a method for forming a sign from a multilayered sheet assembly. A method for forming a sign from a multilayered sheet assembly as referred to in the preamble is usually applied in the textile printing industry in which a sign such as lettering or a logo is cut before being arranged durably on textile. Such a sign is formed by cutting a sheet in a pre-specified shape. This is possible for instance by applying a cutting plotter in which a movable knife cuts a controllable contour out of the sheet, after which the surrounding material which is not used for the sign is removed, whereby the sign remains behind on the carrier layer. This sign can subsequently be arranged on textile, and alternatively also be arranged as for instance lettering on glass, cars or other surfaces which may or may not be smooth. In some cases however the sign comprises not only a closed surface area but also parts with enclosed surface area. These are parts of the sign which are enclosed within the main surface area of the sign but have to be removed from the sign. These include letters such as the letters P, O, R, B and the like in which an enclosed surface area of the sign is present within the surface area to be used. In addition, this can also occur in the case of other random cut shapes in which a portion of the sign has to be removed before the sign can be arranged. Since the cutting lines are often very thin, it is often difficult for an end user to identify all elements to be removed from the sign, and very many and/or very small parts of enclosed surface area can sometimes also be present, whereby manual removal of these parts can be time-consuming and can result in mistakes whereby loss of material can occur or unnecessary replacement products have to be made, with all the drawbacks this entails. In some cases where a known sheet assembly is used all enclosed surface areas must be manually checked in order to remove these parts. This is a highly precise activity in which errors can easily be made.

The present invention thus has for its object, among others, to provide a method for forming a sign from a multilayered sheet assembly which obviates at least one of the stated drawbacks.

In order to achieve the stated object, the method for forming a sign from a multilayered sheet assembly has the feature according to the invention that, while applying a multilayered sheet as described above, the method is defined by the steps of:

A) arranging the multilayered sheet assembly on a cutting device;
B) arranging a peripheral cut in the sheet assembly along an outer periphery of the sign, wherein the peripheral cut is arranged through the sign layer and up to, but not through, the carrier layer;
C) arranging an inner cut in the sheet assembly along a peripheral line of at least one enclosed surface area not forming part of the sign, wherein the inner cut is arranged through the sign layer and through the carrier layer and wherein the inner cut is arranged up to, but not through, the strip layer;
D) separating the strip layer with adhesive retention of the at least one enclosed surface area not forming part of the sign;
E) separating the sign layer from the carrier layer such that the formed sign remains on the carrier layer.

Step A) is performed here before the other steps and steps B) and C) can take place in random sequence, and even simultaneously. Steps D) and E) can also be performed in random sequence or simultaneously.

Through separation of the strip layer from the carrier layer while adhesively retaining the enclosed parts of the surface cut free through the carrier layer the enclosed parts can be removed without the necessity of manual removal of individual parts of the sheet.

In a preferred embodiment of a method according to the invention steps B) and C) are performed using a height-adjustable cutting device, wherein the cutting device is at least selectively adjustable for the purpose of cutting as far as the carrier layer and as far as the strip layer. By varying the cutting depth according to the image a distinction can be made between the outer periphery and the enclosed parts which have to be removed from the main parts of the sign.

In a preferred embodiment of a method according to the invention steps B) and C) are performed using a cutting device comprising a knife movable in the plane of the multilayered sheet assembly. This can be performed for instance using a cutting plotter, such as for instance, though not only, the S2 class cutting plotter from the company Summa as commercially available at the moment of filing of the present patent application. Cutting devices can be utilized on the basis of various known principles, such as for instance cutting plotters, laser cutters and the like. It is important that the cutting device applied is accurately height-adjustable such that a distinction can be made between the various layers of the sheet assembly used.

In a preferred embodiment of a method according to the invention steps B) and C) are performed using a radiation or matter-emitting cutting device. A laser cutting device can for instance be utilized in per se known manner to arrange cuts according to the image along cutting lines in the sheet assembly.

The invention will now be further elucidated on the basis of exemplary embodiments and accompanying figures. In the figures.

Figure 1:
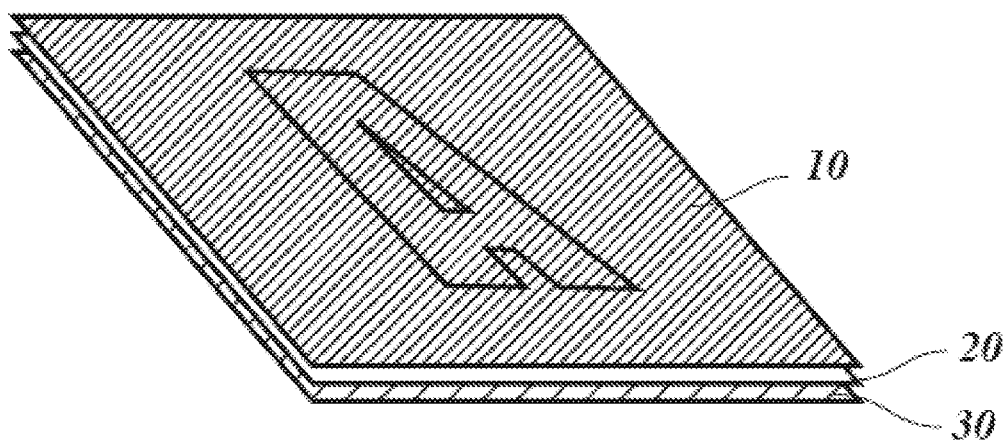
FIG. 1 shows a schematic view of a sheet assembly according to the invention.

FIGS. 4A-D show a cross-sectional schematic view of successive steps of an embodiment of the method for forming a sign from a sheet assembly according to the invention.

The figures are otherwise of purely schematic nature and not drawn to scale. Some dimensions in particular may be exaggerated to greater or lesser extent for the sake of clarity. Corresponding parts are designated as far as possible in the figures with the same reference numeral.

Figure 2:
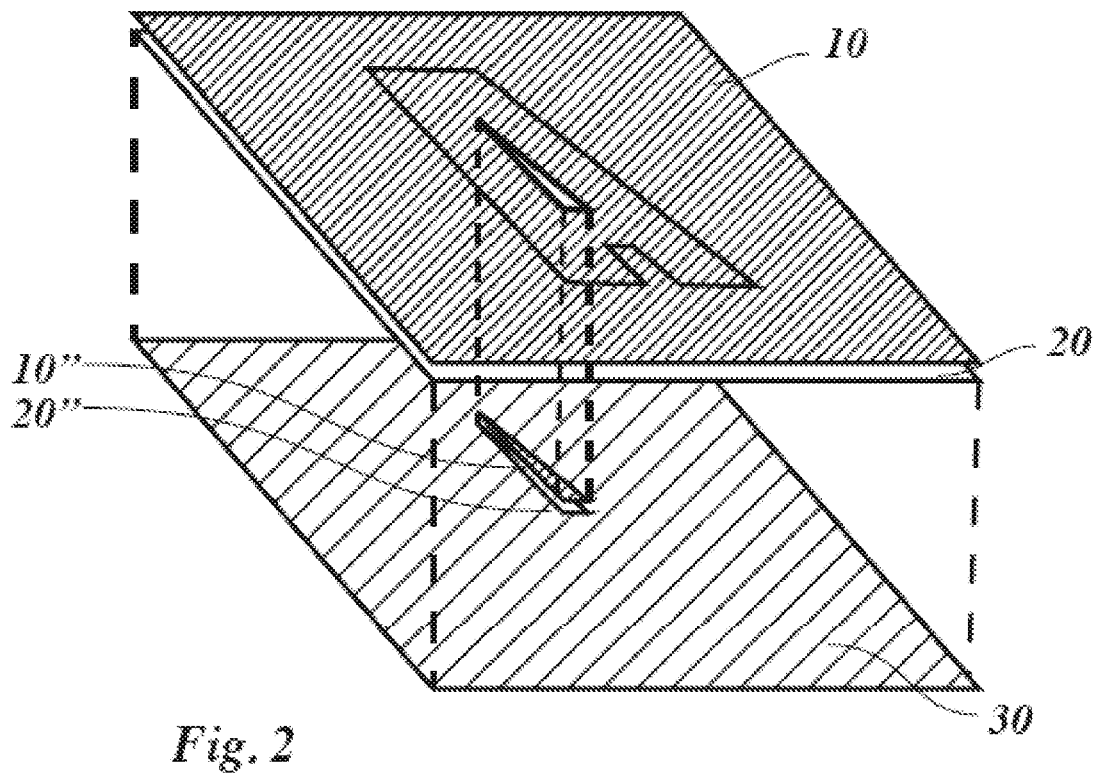
FIG. 2 shows a schematic view of a sheet assembly according to the invention wherein the strip layer has been separated from the carrier layer.

As shown in an exemplary embodiment in FIG. 1, the sheet assembly according to the invention comprises a carrier layer 20 on which a sign layer 10 is arranged via an adhesive layer (not shown). The carrier is provided on the other side with a strip layer 30 which is arranged by means of an adhesive layer (not shown) on carrier layer 20. Shown on sign layer 10 is a sign in the form of the letter A. The letter A has a triangular part within the letter which has to be removed in order to form the sign. In order to form this sign the sign is cut along the outer periphery of the sign by a cutting plotter. A knife is moved here accurately and according to the image along the outer contours of the sign in the plane of the sheet assembly. During the cutting the knife is adjusted in height here such that the knife cuts through the upper layer, sign layer 10, while not cutting through carrier layer 20. In practice the knife may make partial contact with and even cut into carrier layer 20, but not cut through it completely in order to thus preserve the structural integrity of this layer at the position of the outer periphery. The triangular enclosed surface area in the head of the letter A is also cut free with the knife. The knife is however adjusted in height here such that carrier layer 20 is cut through completely at the position of this inner cut. Strip layer 30 is however not cut through here. Here too the knife may in practice optionally make contact with the strip layer, although the integrity of this layer must not be adversely affected at the position of this inner cut such that it detaches from this layer. During separation of strip layer 30 as shown in FIG. 2 the triangular enclosed head part of the letter A is hereby taken away by the tacky adhesive layer between the strip layer and the carrier. The part of carrier layer 20" and the part of sign layer 10" of this redundant enclosed part are both removed here. For the sake of clarity in the figures the separation of the layers is shown with broken line parts. It will be apparent that in practice this separation need not necessarily take place along lines lying perpendicularly of the surface. It is advantageous in practice to carry out this separation in a peeling-away movement of the sheet layers.

Carrier layer 20 is formed from a polyester film. This layer can alternatively also be formed from another material such as paper or plastic, optionally provided with a silicone coating or other release coating.

Figure 3:
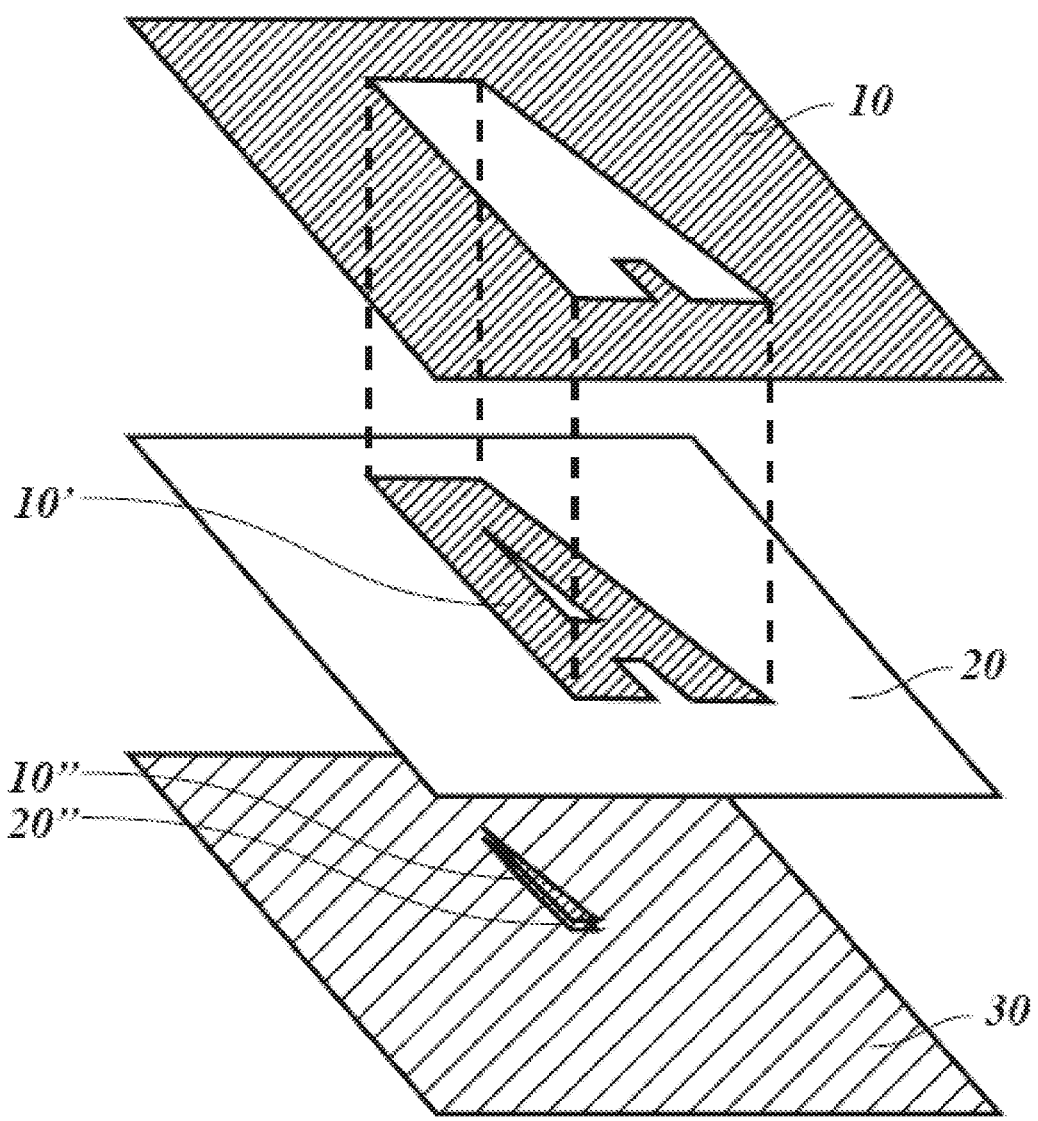
FIG. 3 shows a schematic view of a sheet assembly according to the invention wherein the strip layer has been separated from the carrier layer and the parts surrounding the sign have also been separated.

Shown in FIG. 3 is how the redundant outer parts of the letter A are separated with sign layer 10 from carrier layer 20 such that the letter A sign 10' remains on the carrier layer. In this example the sign takes the form of the letter A, although it will be apparent that this is only one example of the infinite number of sign shapes which can be formed with this sheet assembly. The letter A formed in this manner using the sheet assembly according to the invention can subsequently be pressed onto a T-shirt or other textile. In this example the sign layer is embodied as thermally activated layer which can be transferred onto textile under increased pressure and at increased temperature, such as for instance in a textile heat press. This method is particularly suitable for arranging and forming for instance shirt numbers on sports clothing, names or texts on T-shirts, lettering and logos on cars or windows and the like.

Figure 4A:
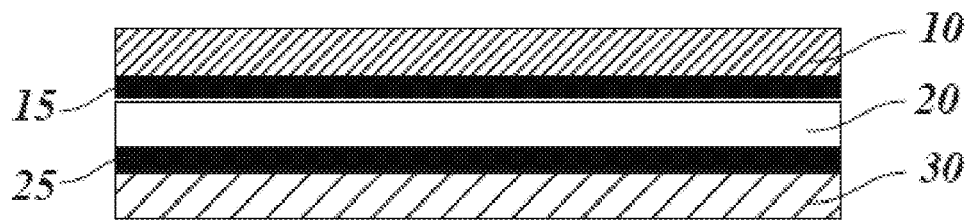
Figure 4B:
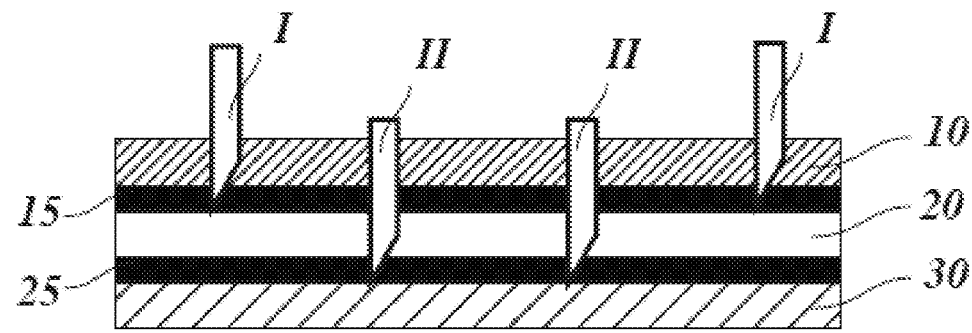
Figure 4C:
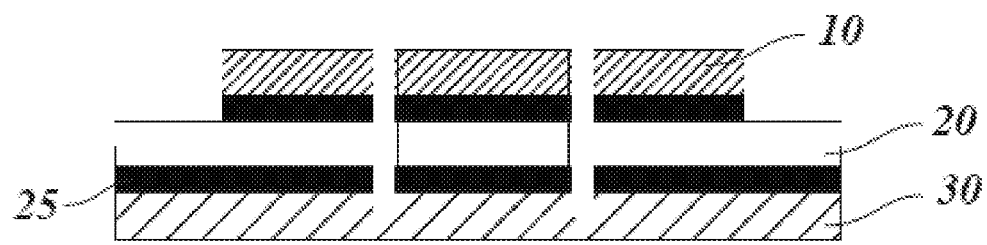
Figure 4D:
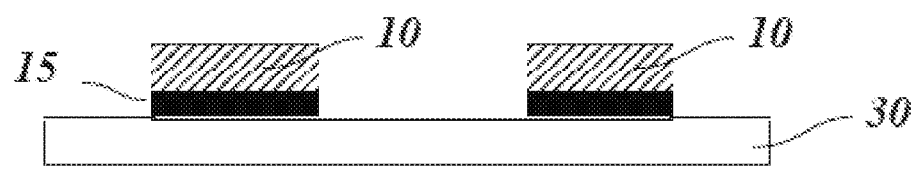

FIGS. 4A-D show a schematic cross-section of the cutting process, and in particular the cutting depths of the movable and height-adjustable knife. FIG. 4A shows a sheet assembly with sign layer 10, carrier layer 20 and strip layer 30 with interposed adhesive layers 15 and 25. Shown in FIG. 4B is how knife I cuts the outer periphery of a sign through sign layer 10 as far as carrier layer 20. Knife II then makes the inner cuts, such as in the previous example the triangle of the head part of the letter A. The inner cuts are made by knife II while cutting through the sign layer and carrier layer 20 but while preserving the structural integrity of strip layer 30. The result of this cutting action is shown in FIG. 4C, in which the redundant portion of the sign layer lying outside the sign has already been removed. The thickness of the cuts is exaggerated here in order to elucidate the operating principle. By separating strip layer 30 from carrier layer 20 the carrier layer 20 is released at the position of adhesive layer 25 with adhesive attachment of the inner part shown centrally in FIG. 4C. FIG. 4D shows the result in which a sign is formed on the carrier layer. This sign can be arranged on an object, optionally via an application film or application tape.

Although the invention has been further elucidated on the basis of several exemplary embodiments, it will be apparent that the invention is by no means limited thereto. On the contrary, many variations and embodiments are still possible within the scope of the invention for a person with ordinary skill in the art.

The invention claimed is:

1. Method for forming a sign from a multilayered sheet assembly, the sheet assembly comprising a carrier layer on which a sign layer is arranged on a first side via a first adhesive layer, wherein the sheet assembly further comprises a strip layer which is arranged via a second adhesive layer in adhesively separable manner on a second side of the carrier layer, the method comprising the steps of:
    A) arranging the multilayered sheet assembly on a cutting device;
    B) arranging a peripheral cut in the sheet assembly along an outer periphery of a sign, wherein the peripheral cut is arranged through the sign layer and up to, but not through, the carrier layer;
    C) arranging an inner cut in the sheet assembly along a peripheral line of at least one enclosed surface area not forming part of the sign, wherein the inner cut is arranged through the sign layer and through the carrier layer and wherein the inner cut is arranged up to, but not through, the strip layer;

D) separating the strip layer with adhesive retention of the at least one enclosed surface area not forming part of the sign; and E) separating the sign layer from the carrier layer such that the formed sign remains on the carrier layer.

2. Method as claimed in claim 1, wherein said cutting device is a height-adjustable cutting device, wherein steps B) and C) are performed using a said height-adjustable cutting device, and wherein the height-adjustable cutting device is at least selectively adjustable for the purpose of cutting as far as the carrier layer and as far as the strip layer.

3. Method as claimed in claim 1, wherein said multilayered sheet assembly is in a single plane, wherein said cutting device comprises a knife that is movable in said plane of the multilayered sheet assembly, and wherein steps B) and C) are performed using said cutting device comprising a said knife, movable in the plane of the multilayered sheet assembly.

4. Method as claimed in claim 1, wherein steps B) and C) are performed using a radiation or matter-emitting cutting device.

* * * * *